US 6,859,729 B2

(12) United States Patent
Breakfield et al.

(10) Patent No.: US 6,859,729 B2
(45) Date of Patent: Feb. 22, 2005

(54) NAVIGATION OF REMOTE CONTROLLED VEHICLES

(75) Inventors: David K. Breakfield, Austin, TX (US); Jerry D. Martin, San Antonio, TX (US); Fred D. Paul, Georgetown, TX (US)

(73) Assignee: Bae Systems Integrated Defense Solutions Inc., Austin, TX (US)

( * ) Notice: Subject to any disclaimer, the term of this patent is extended or adjusted under 35 U.S.C. 154(b) by 0 days.

(21) Appl. No.: 10/274,839

(22) Filed: Oct. 21, 2002

(65) Prior Publication Data

US 2004/0078137 A1 Apr. 22, 2004

(51) Int. Cl.⁷ .............................................. G01C 21/26
(52) U.S. Cl. ...................... 701/216; 701/200; 701/213; 701/222; 701/224; 701/300; 342/357.06; 342/357.14
(58) Field of Search ................................. 701/200, 213, 701/214, 215, 216, 220, 222, 223, 224, 300; 340/988, 989, 992; 342/357.01, 357.06, 357.07, 357.14

(56) References Cited

U.S. PATENT DOCUMENTS

| | | | | |
|---|---|---|---|---|
| 4,445,706 A | * | 5/1984 | Jarosek ........................ 172/310 |
| 5,307,272 A | | 4/1994 | Butler et al. ........... 364/424.02 |
| 5,646,843 A | * | 7/1997 | Gudat et al. ..................... 701/3 |
| 5,684,696 A | | 11/1997 | Rao et al. .............. 364/424.029 |
| 5,757,646 A | * | 5/1998 | Talbot et al. ................ 701/215 |
| 5,890,091 A | | 3/1999 | Talbot et al. ................ 701/215 |
| 6,072,433 A | | 6/2000 | Young et al. ................ 342/386 |
| 6,122,572 A | | 9/2000 | Yavnai ......................... 701/23 |
| 6,292,751 B1 | * | 9/2001 | Frank .......................... 701/220 |
| 6,333,631 B1 | | 12/2001 | Das et al. .................... 324/326 |
| 6,411,871 B1 | | 6/2002 | Lin .............................. 701/27 |
| 6,560,535 B2 | * | 5/2003 | Levy et al. ................. 701/213 |
| 2002/0035419 A1 | | 3/2002 | Lin .............................. 701/27 |

OTHER PUBLICATIONS

"Formation alignment of multiple autonomous vehicles," *NASA's Jet Propulsion Laboratory*, Oct. 2002, 3 pages from http://www.nasatech.com/Briefs/Oct02/NPO20599.html.

"MECH1810 Computational Engng. 1B (Revised), Assignment 3—Estimating Mobile Robot Position," Australian Center for Field Robotics (ACFR), the University of Sydney. 11 pages printed from the ACFR website://www.acfr.usyd.edu.au/teaching/1st–year/mech1810/material/assignments/ . . . ass3.htm, on Oct. 4, 2002.

(List continued on next page.)

*Primary Examiner*—Gertrude A. Jeanglaude
(74) *Attorney, Agent, or Firm*—Fulbright & Jaworski LLP

(57) ABSTRACT

Methods for navigating a remote controlled vehicle, methods for maintaining a formation of remote controlled vehicles, and remote controlled vehicles using those methods. A vehicle is navigated using the Global Positioning System (GPS). Upon dropout of the GPS, the vehicle is navigated using a laser tracking system and one or both of: (i) a compass and (ii) wheel encoders. The navigation system may be used, in one embodiment, to maintain an echelon formation of remote controlled mine detection vehicles.

24 Claims, 6 Drawing Sheets

OTHER PUBLICATIONS

FanBeam4—Laser Radar Positioning System description, Measurement Devices, Ltd. Company, Scotland, Sep. 19, 2001, from www.mdl.co.uk/marine/fanbeam4.htm.

FanBeam4—Technical Specifications, Measurement Devices, Ltd. Company, Scotland, Jul. 4, 2001, from www.mdl.co.uk/marine/fanbeam4t.htm.

FanBeam4—Single Target DP Software, Precision Dynamic Positioning Control Software for Fanbeam, Measurement Devices, Ltd. Company, Scotland, Jul. 4, 2001, from www.mdl.co.uk/marine/singletargetsw.htm.

FanBeam4—Seismic Software, Precision Positioning and Tracking Software for Fanbeam, Measurement Devices, Ltd. Company, Scotland, Jul. 7, 2001, from www.mdl.co.uk/marine/seismicsw.htm.

Farwell et al., "RTK–based vehicle tracking and unmanned operation for agriculture," *ION GPS–99 12th International Technical Meeting of the Satellite Division of the Institute of Navigation*, Sep. 14–17, 1999, Session A6, pp. 2047–2054, 1999.

Joint Robotics Program Master Plan, 2001.

Joint Robotics Program Master Plan, 2002.

Web page relating to "agv and positioning applications," 1 page from http://www.gcsltd.co.uk/body_applications.html, Guidance Control Systems, Ltd., 2002, printed on Oct. 4, 2002.

Web pages relating to "The Robot Channel—Sensor Lab Kits, " 2 pages from http://www.smartrobots.com/sensor_lab_kits.htm, Aug. 1, 2002, printed on Oct. 4, 2002.

* cited by examiner

NAVIGATION OF REMOTE CONTROLLED VEHICLES

Aspects of this invention were made with government support under a GSTAMIDS (Ground Stand-off Mine Detection System) contract. Accordingly, the government may have certain rights in this invention.

BACKGROUND OF THE INVENTION

1. Field of the Invention

The present invention relates generally to the navigation of remote controlled vehicles. More particularly, it concerns the navigation of remote controlled vehicles through the combined use of differential GPS and laser tracking along with compass navigation and/or wheel encoders. Even more particularly, it concerns navigation to maintain an echelon formation of robotic vehicles useful in landmine clearing applications.

2. Description of Related Art

Accurate navigation of remote controlled vehicles is important in many fields. For instance, in landmine clearing applications, one typically employs a formation of robotic, remotely controlled vehicles in echelon formation. Maintaining a proper, tight echelon formation requires accurate navigation of each vehicle relative to other vehicles. Likewise, the ability to accurately mark the location of mines requires accurate navigation. Sometimes accuracy to within 10 cm is required.

To achieve accurate navigation, many systems rely upon the Global Positioning System (GPS) and, particularly, differential GPS (DGPS). Although GPS provides an extremely useful navigation technique, it unfortunately can experience dropouts, effectively leaving no or insufficient navigation signal for a period of time. During a dropout period, remotely controlled vehicles may become misguided and/or fall out of formation. In applications such as landmine clearing, this is unacceptable.

To compensate for its limitations, GPS is sometimes replaced in favor of other navigation techniques: "dead reckoning," which typically relies on inertial measurements, ground speeds, etc.; landmarks; celestial objects; the Omega Radio signal based worldwide navigation system; LORAN-C (LOng-RANge navigation), which is radio range finding along coastal areas; SatNav, which is a satellite-based radiodetermination system; or Sonar detectors.

Unfortunately, each of these methods suffers from drawbacks. Systems relying upon dead reckoning/inertial navigation systems sometimes suffer because navigation accuracy is usually time-dependent due to inherent continuous drift characteristics. The longer inertial navigation systems are used on their own, the greater the error associated with drift. Accordingly, the error may become so great as to overrun a maximum required navigational accuracy. Landmark navigation is highly dependent upon local area or horizon landmarks and/or reflectors. Celestial navigation typically determines position determination based on "shooting" known reference stars; this technique, however, is complicated and only works at night in good weather with limited precision. Omega is based on relatively few radio direction beacons, its accuracy is a disappointing 4 to 7 kilometers, and OMEGA station maintenance was discontinued in late 1997. LORAN-C suffers from limited coverage (mostly coastal) and is based upon radio signal timing, exhibiting an accuracy of only 20 to 100 meters. SatNav is based on low-frequency doppler measurements, so it is sensitive to small movements at a receiver. Its accuracy is only 10 to 50 meters, and although its coverage is worldwide, it is non-continuous. Finally, sonar detectors are useful for obstacle detection but not positioning.

Other potentially useful navigation techniques include laser tracking systems, compass-based navigation, and wheel encoders. Laser tracking systems are typically based on laser radar position measuring techniques and provide very accurate distance measurement, coupled with a gimbled axis for azimuth direction information. Compass-based and wheel encoder-based navigation systems are, in turn, well-suited for providing very accurate angular or directional information. Because these systems offer respective advantages, some remote controlled vehicles may utilize one of the systems to achieve navigation. Despite their advantages, existing navigation systems do not utilize these techniques in combination with GPS in such a way to eliminate problems associated with GPS dropout, as disclosed herein.

The referenced shortcomings of conventional methodologies mentioned above are not intended to be exhaustive, but rather are among many that tend to impair the effectiveness of previously known techniques concerning the navigation of remote controlled vehicles. Other noteworthy problems may also exist; however, those mentioned here are sufficient to demonstrate that methodology appearing in the art have not been altogether satisfactory and that a significant need exists for the techniques described and claimed in this disclosure.

SUMMARY OF THE INVENTION

Shortcomings of the prior art are reduced or eliminated by the techniques disclosed herein. These techniques are applicable to a vast number of applications, including but not limited to applications involving the navigation of remote controlled vehicles for landmine clearing applications.

In one embodiment, the invention involves a method for navigating a remote controlled vehicle. The vehicle is navigated using the Global Positioning System (GPS). Upon dropout of GPS, the vehicle is then navigated using a laser tracking system and one or both of: (i) a compass, and (ii) wheel encoders.

In other embodiments, the navigation is aimed towards maintaining the vehicle in echelon formation with other vehicles. The vehicles may be mine detection vehicles (MDVs). The GPS may be differential GPS (DGPS). The navigation using a laser tracking system and one or both of (i) a compass and (ii) wheel encoders may occur automatically upon dropout of GPS. Additionally, navigation of the vehicle may include using a physical waypoint marker upon dropout of GPS. Additionally, navigation may include using an inertial navigation system upon dropout of the GPS. A zero velocity update algorithm may be used in conjunction with the inertial navigation system.

In another embodiment, the invention involves a method for maintaining a formation of remote controlled vehicles. The vehicles are navigated using the Global Positioning System (GPS) to maintain the formation. Upon dropout of the GPS, one or more of the vehicle are navigated using a laser tracking system and one or both of: (i) a compass, and (ii) wheel encoders.

In other embodiments, the formation may include an echelon formation. The vehicles may include mine detection vehicles (MDVs). The GPS may be differential GPS. One vehicle may experience GPS dropout at a different time than another vehicle. Physical waypoint markers and/or an inertial navigation system may also be used upon dropout of the GPS to maintain the formation. The inertial navigation system may include a zero velocity update algorithm.

In another embodiment, the invention involves a method for maintaining an echelon formation of remote controlled mine detection vehicles (MDVs). The MDVs are navigated using a differential Global Positioning System (DGPS) to maintain the echelon formation. A dropout of the DGPS is experienced in one or more MDVs. Each MDV not experiencing the dropout is navigated using the DGPS system to maintain the echelon formation. Upon dropout of the DGPS, each MDV experiencing the dropout is navigated using a laser tracking system and one or more of: (i) a compass, (ii) wheel encoders, and (iii) a physical waypoint marker to maintain the formation.

In another embodiment, the invention involves a remote controlled vehicle configured to maintain a formation with other vehicles, using the techniques summarized above.

As used herein, "dropout" simply refers to the condition in which a navigation signal is lost to a degree such that it is no longer useable for navigation.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein. Identical element numbers in different figures represent identical or similar elements.

DESCRIPTION OF ILLUSTRATIVE EMBODIMENTS

Techniques of this disclosure allow one to reliably and accurately navigate remote controlled vehicles even when a GPS signal is lost (dropout occurs). Upon GPS dropout, one may utilize laser tracking along with compass navigation and/or wheel encoders. Additionally, one may utilize physical waypoint markers and/or an inertial navigation system to further aid in navigation. Using these techniques to achieve reliable and accurate navigation, remote controlled vehicles can be maintained in formation, such as a tight echelon formation useful in landmine clearing applications.

These techniques provide not only reliable and accurate navigation, but also allow a single operator to remotely control several vehicles (in a representative embodiment, 3 different vehicles). In contrast, prior art systems typically require one operator per vehicle.

Figure 1:
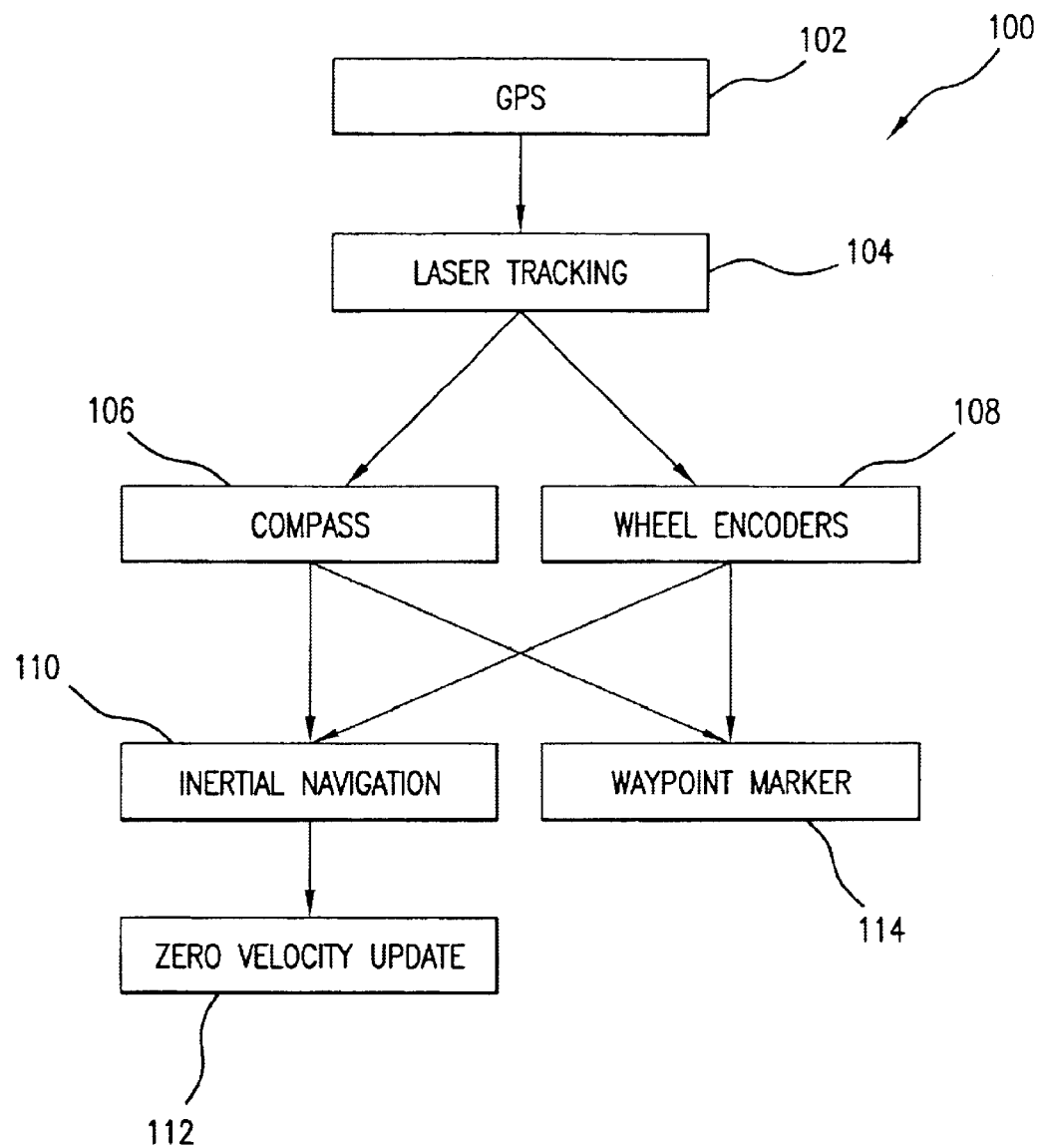
FIG. 1 is a block diagram illustrating methods for navigating a remote controlled vehicle, in accordance with embodiments of the invention.

FIG. 1 illustrates representative embodiments for navigating remote controlled vehicles. In methodology 100, GPS navigation 102, laser tracking navigation 104, compass navigation 106, wheel encoders 108, inertial navigation 110 having zero velocity update functionality 112, and physical waypoint markers 114 are used in combination.

In particular, GPS navigation 102 may be used initially to navigate one or more remote controlled vehicles. In one embodiment, differential GPS (DGPS) may be used, although it will be understood by those of ordinary skill in the art that any other derivative of GPS may be used as well. Using GPS, one may accurately navigate remote controlled vehicles to do a variety of tasks. In one embodiment, vehicles may be navigated to maintain a formation—a physical arrangement relative to one another. In one embodiment, an echelon formation may be employed. Such a formation is useful in several applications, including applications in which landmines are marked and/or cleared. In this type of application, the remote controlled vehicles may be mine detection vehicles (MDVs).

In operation, GPS 102 may experience dropout. In other words, for one or more reasons, one may lose the GPS signal, rendering GPS unusable temporarily or for an extended period of time. During GPS dropout, it is important to be able to maintain accurate navigation of the remote controlled vehicles. Accordingly, some backup system of navigation should be employed so that, for instance, the vehicles may maintain their formation and continue with their task.

In one embodiment of the methodology of FIG. 1, upon dropout of GPS 102, remote controlled vehicles are navigated using a combination of laser tracking 104 along with one or both of compass navigation 106 and wheel encoders 108. Switching to laser tracking 104 and one or more additional techniques may, in one embodiment, occur automatically upon realization that GPS 102 has dropped-out. In other embodiments, the switching to such systems may occur manually or through some other algorithm.

Laser tracking 104 may include any of a number of commercially-available or known laser tracking systems. As is known in the art, laser tracking systems provide for very accurate distance measurement, which may be used to guide navigation. To supply requisite angular information, one turns to compass navigation 106 and/or wheel encoders 108. Compass navigation 106 refers generally to any of a number of compass-based navigation systems commercially-available or known in the art to achieve navigation through magnetically-based measurement, or the like. Likewise, wheel encoders 108 refer generally to any of a number of wheel encoder systems commercially-available or known in the art to achieve navigation through the measurement of wheel rotations, or the like.

Using compass navigation 106 in combination with laser tracking 104 may achieve, in some situations, sufficient distance and angular control to satisfactorily navigate remote controlled vehicles even when GPS 102 has dropped-out. In other situations, sufficient distance and angular control may be achieved using wheel encoders 108 in combination with laser tracking 104. In still other situations, one may wish to use compass navigation 106, wheel encoders 108, and laser tracking 104 all in combination. Using the three techniques together may be particularly suitable in situations in which a high degree of navigational accuracy is required—e.g., situations in which accuracy of 10 cm is required, which is typical in landmine applications.

Elements 110 and 112 of FIG. 1 illustrate that still additional navigational techniques may be utilized in combination with one or more of the other illustrated techniques, once GPS dropout occurs. Specifically, an inertial navigation system 110 may be used. Inertial navigation system 110 refers to any of the systems commercially-available or known in the art that rely upon inertial measurements or ground speeds to navigate a vehicle. As illustrated, zero velocity update algorithm 112 may be used in conjunction with inertial navigation system 110 to improve performance. Suitable zero velocity update techniques are disclosed in U.S. Pat. No. 6,292,751, which is incorporated by reference in its entirety.

Figure 2:
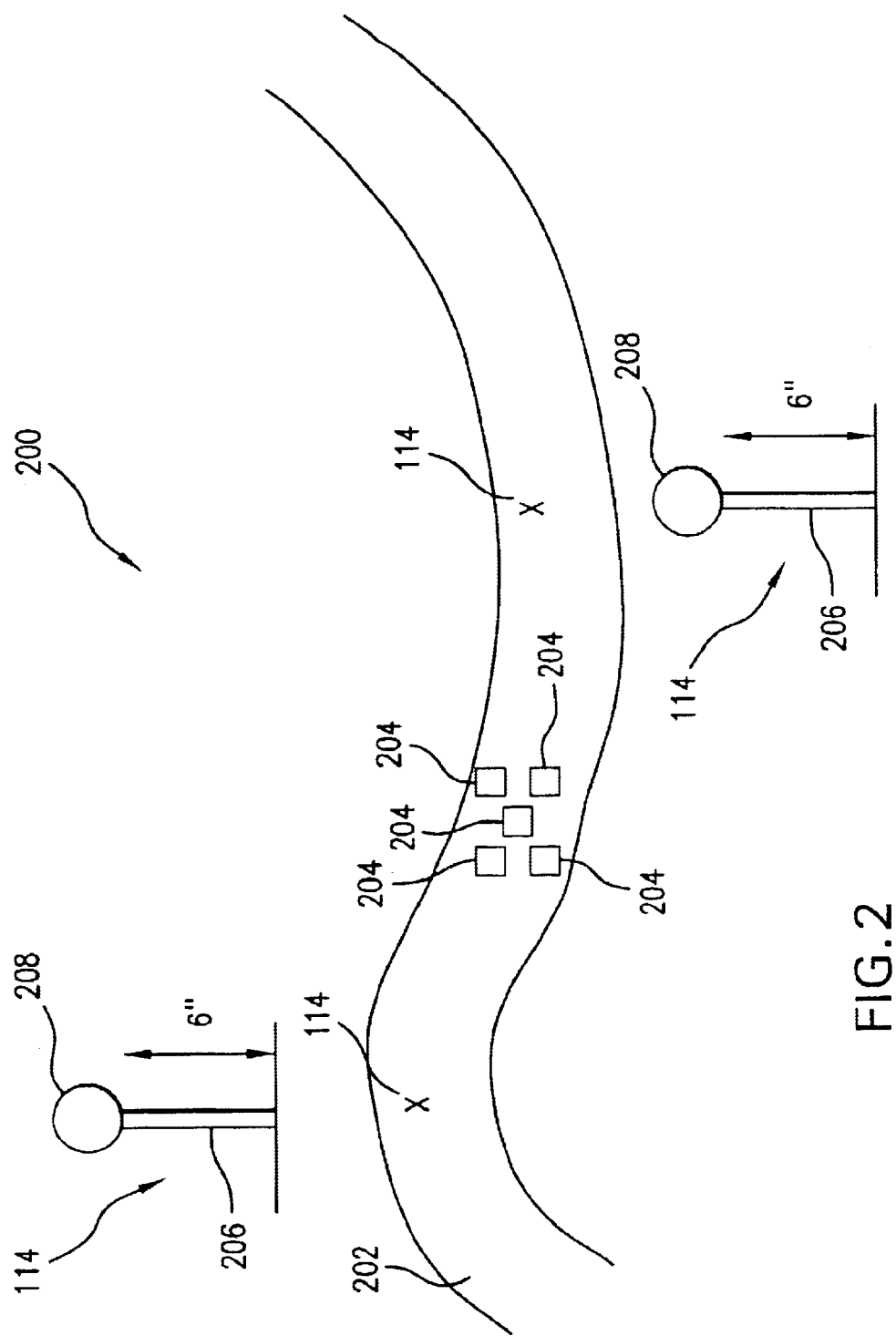
FIG. 2 is a schematic diagram illustrating the use of physical waypoint markers, in accordance with embodiments of the invention.

Another additional navigational technique that may be used is illustrated as element 114 in FIG. 1—a physical waypoint marker. Physical waypoint marker 114 is any physical marker that can be placed in a known position or at known coordinates and later detected by one or more vehicles so that those vehicles can correlate the marker with the known position. For instance, physical waypoint marker 114 may be placed upon a path at a known location, ascertained by GPS. Later, one or more vehicles may locate the marker and correlate the marker with the GPS position. In this way, the one or more vehicles may have an additional navigational reference point from which to navigate. Such a reference point may be particularly useful especially if GPS has dropped-out in the vicinity around the physical waypoint marker 114. FIG. 2 illustrates the use of physical waypoint markers in more detail.

The arrows of FIG. 1 do not necessarily connote a direction of events. Rather, the arrows of FIG. 1 are meant simply to show that upon GPS 102 dropout, control may be shifted to laser tracking 104 and compass navigation 106 and/or wheel encoders 108. In addition to compass navigation 106 and/or wheel encoders 108, additional techniques such as inertial navigation system 110 and/or physical waypoint marker 114 may be used, upon GPS 102 dropout.

FIG. 2 shows methodology 200 for using physical waypoint markers 114. Included in FIG. 2 are a path 202, two physical waypoint markers 114, and five remote controlled vehicles 204. In operation, physical waypoint markers 114 may be placed in known positions along path 202. The positions of the physical waypoint markers may be known through the use of GPS or any other navigational technique. If the physical waypoint markers 114 are known through GPS, the markers themselves may be called GPS physical waypoint markers. As illustrated, the physical waypoint markers 114 may include a support member 206 and a detection member 208. In one embodiment, the support member 206 may extend about 6 inches from the ground, although this is representative only and not limiting. The purpose of detection member 208 is to allow remote controlled vehicles 204 to detect the physical waypoint marker 114. Although shown as a circular bulb meant to be reflective, the design may vary greatly and may be any shape or material to increase its probability of being detected by vehicles 204. In different embodiment, remote controlled vehicles 204 may detect the physical waypoint markers 114 through the use of machine vision, by detecting a reflection from detection member 208, or the like. Relaying the GPS coordinates or position information associated with physical waypoint marker 114 to one or more of the vehicles 204 may be done via radio transmission, IR transmission, or any other wireless communication technique.

Figure 3:
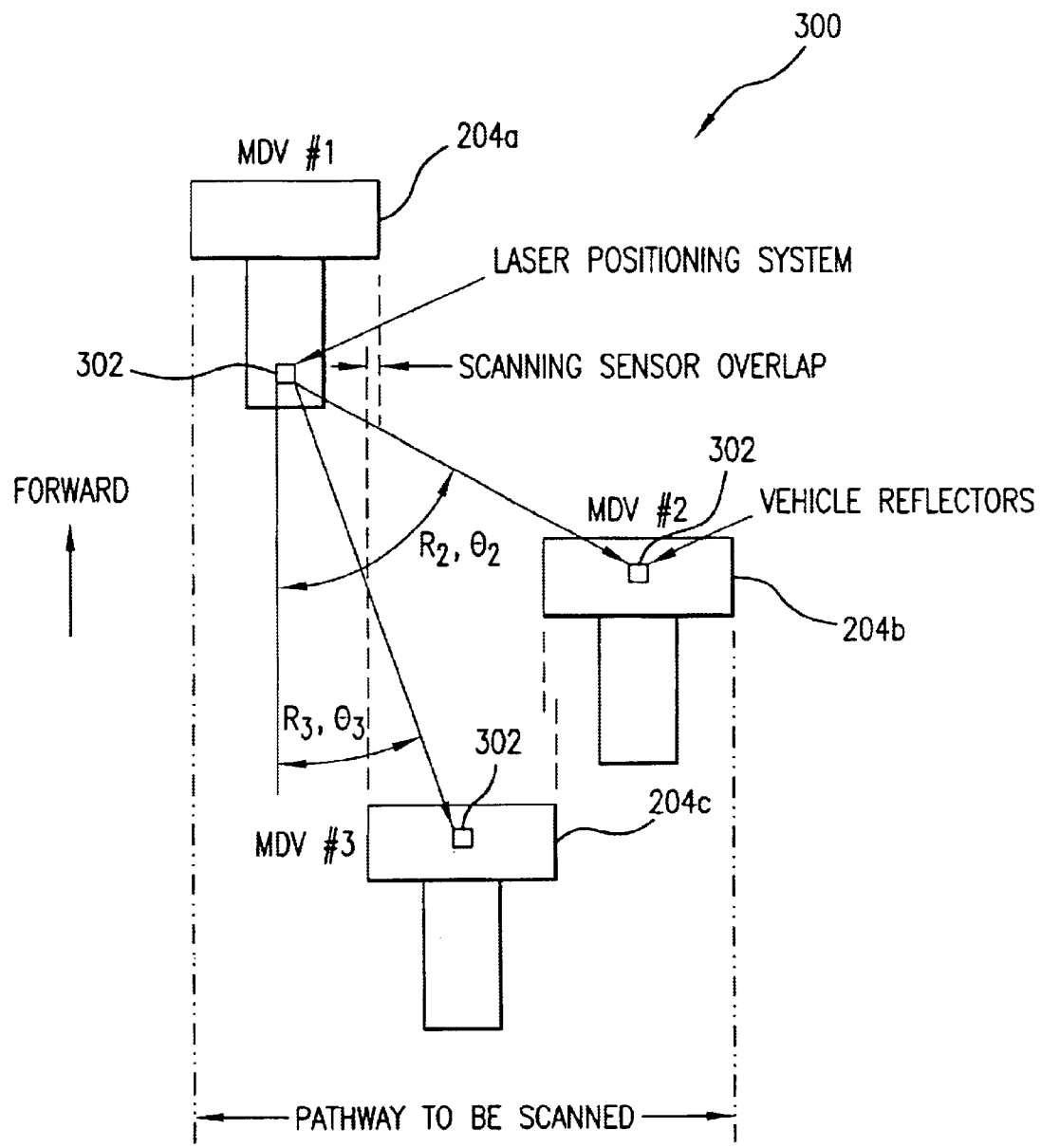
FIG. 3 is a schematic diagram illustrating methods for maintaining mine detection vehicles in formation, in accordance with embodiments of the invention.

Turning to FIG. 3, there is shown a formation 300 of remote controlled vehicles 204, which are, in this illustration, mine detection vehicles (MDVs). In FIG. 3, the vehicles are being maintained in an echelon formation, although it will be understood by those of ordinary skill in the art that any other type of formation requiring navigational control may be maintained as well.

Vehicle 204a is the lead MDV, while vehicles 204b and 204c are following MDVs (MDVs #2 and #3 respectively). Each MDV is equipped with laser tracking equipment 302, which may include a laser and/or reflectors. Also included on one or more of MDVs 204 are a GPS system (not shown), a compass navigation system 106 (not shown), wheel encoders 108 (not shown), inertial navigation system 110 (not shown), and/or a physical waypoint marker detection system 114 (not shown).

The different vehicles 204 of FIG. 3 may experience GPS dropout at different times. In that case, the vehicles 204 experiencing dropout may switch to a combination of laser tracking 104 using laser tracking equipment 302 in combination with compass navigation 106 and/or wheel encoders 108. Additionally, the vehicles 204 may utilize inertial navigation 110 (with or without zero velocity update techniques 112) and/or physical waypoint markers 114. The vehicles that have not experienced GPS dropout may continue to use GPS to, for instance, re-establish or maintain a tight formation.

Through the accurate navigation provided by the methodology of FIGS. 1 and 2, the vehicles 204 of FIG. 3 are able to maintain a formation, such as the tight echelon formation illustrated. This ability assists in, for instance, the effective clearing and marking of landmines.

Figure 4:
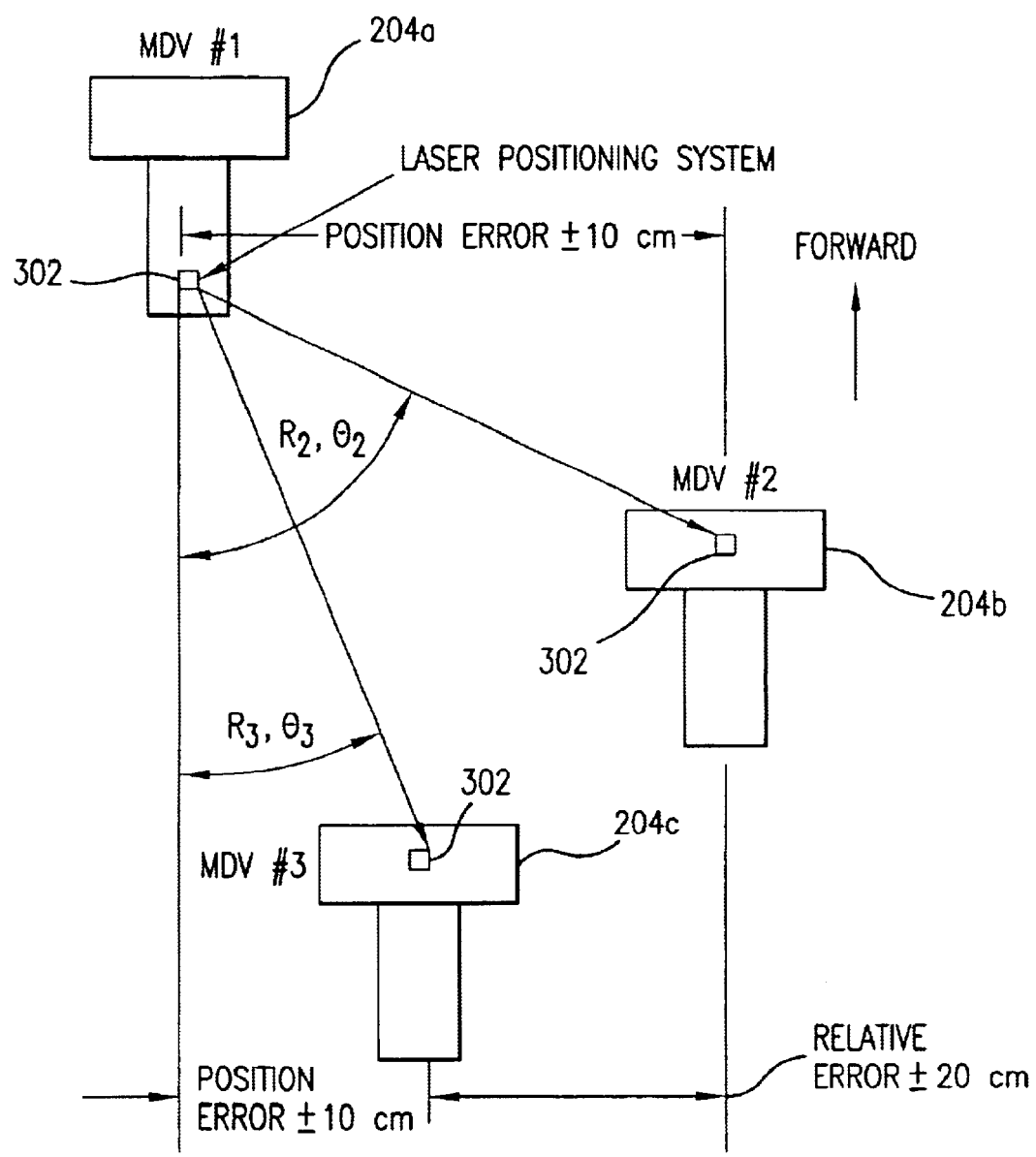
FIG. 4 is a schematic diagram illustrating methods for maintaining mine detection vehicles in formation, showing error considerations, in accordance with embodiments of the invention.
Figure 5:
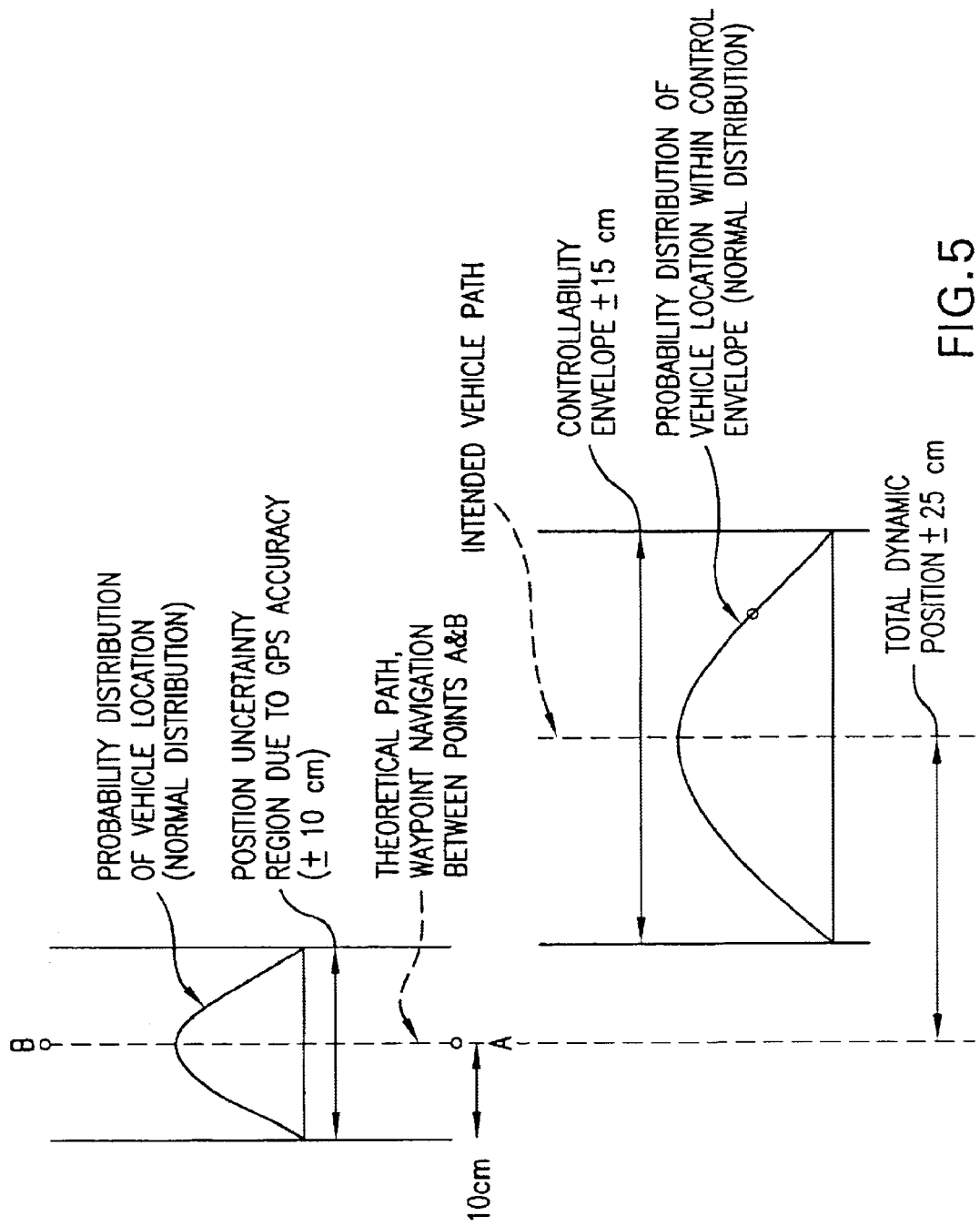
FIG. 5 is a schematic diagram illustrating additional error considerations, in accordance with embodiments of the invention.

FIGS. 4 and 5 illustrate representative error considerations for embodiments of the present disclosure. In FIG. 4, as is apparent, the positional error associated between vehicle 204a and 204b is ±10 cm. The same error is associated between vehicle 204a and 204c. As between vehicles 204b and 204c, the relative error is ±20 cm since this error includes error between 204a and 204b as well as error between 204a and 204c. These values for error are not limiting; they are included to illustrate, among other things, how error may propagate between and among vehicles in formation. Nevertheless, even in view of error propagation, very accurate navigation can still be achieved (±10 or 20 cm in the illustrated embodiment) using the techniques of this disclosure.

FIG. 5 is related to FIG. 4 in that it further illustrates the error issues of FIG. 4. In FIG. 5, error probability distributions and positional uncertainty plots are presented. Again, the values for these errors are not limiting and are included to illustrate a representative embodiment.

Figure 6:
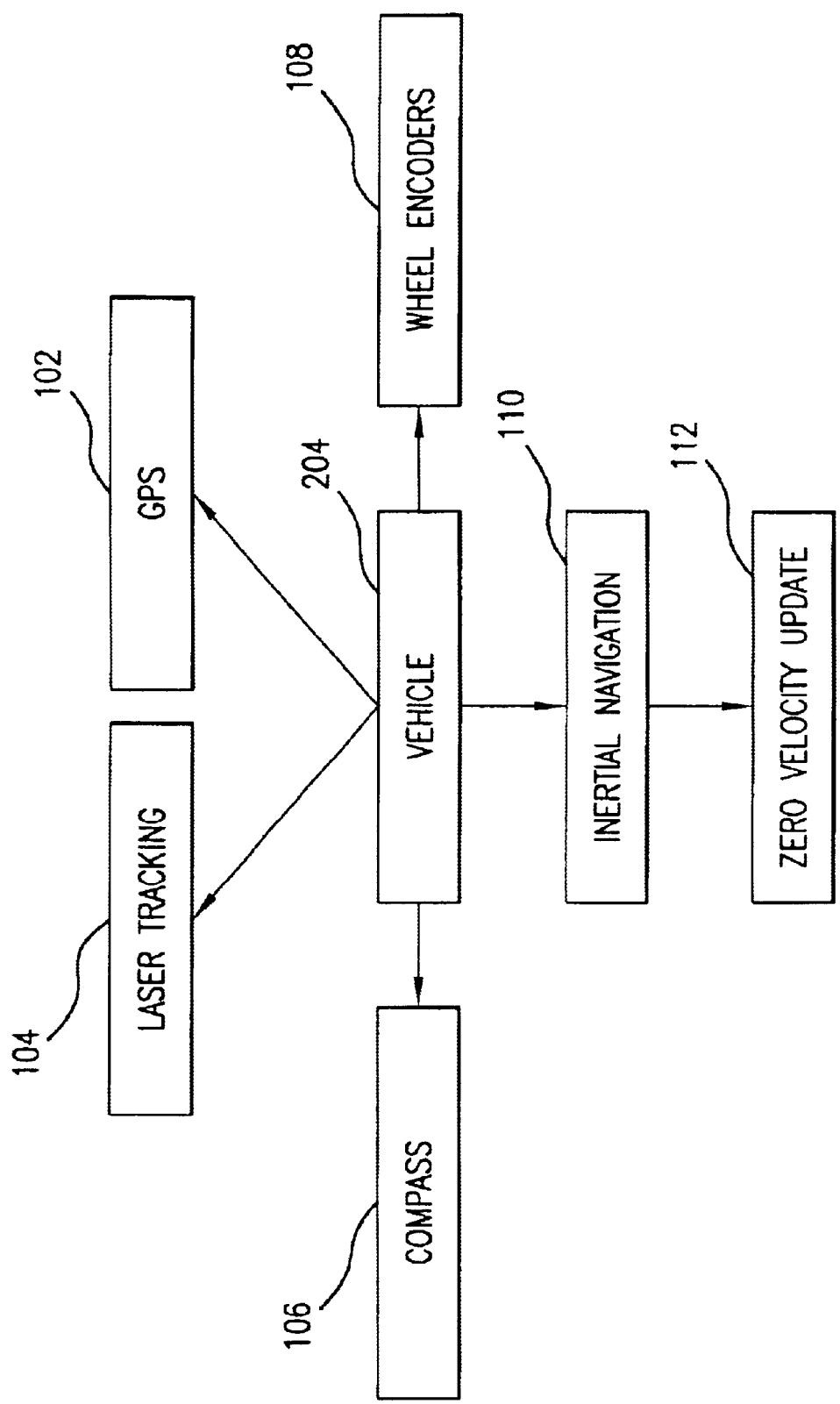
FIG. 6 is a block diagram illustrating remote controlled vehicles, in accordance with embodiments of the invention.

FIG. 6 illustrates a remote controlled vehicle 204 equipped to perform the navigational techniques of this disclosure. As illustrated, the vehicle 204 includes systems for utilizing the techniques illustrated and described in relation to FIG. 1. The arrows of FIG. 6 do not necessarily connote a direction of events. Rather, the arrows of FIG. 6 are meant simply to show what component systems are included with (or coupled to or in operative relation with) vehicle 204.

Having described embodiments of the present disclosure with relation to FIGS. 1–6, attention will be turned towards discussing certain individual components of those figures as well as exemplary applications of their operation in more detail.

Tele-Operation and Navigation Advantages

The remote controlled aspect of vehicles 204 offers many advantages. For instance, in the context of landmine detection vehicles, techniques of this disclosure may allow an operator to remotely control up to three mine detection vehicles in order to sweep a pathway of eight meters maximum width. The techniques provide the capability to establish and maintain echelon formation with the required accuracy to undergo landmine clearing and other landmine applications. The remote controlled vehicles may provide (a) video feedback to the operator for control over extended distances, (b) vehicle status information, (c) and all control actuators necessary to accomplish the mission.

The navigational techniques of this disclosure offer many advantages as well, including advantages for landmine applications. They provide a means to determine a vehicle's location, either absolute or relative, within (in one embodiment) 10 cm. If the principal navigation method is GPS-based, techniques of this disclosure provide a backup method for mission execution when GPS is unavailable (dropout).

Global Positioning System

The GPS navigation system 102 offers important navigation capabilities. GPS may utilize one or both of at least two possible error corrected configurations.

First, Real Time Kinematic (RTK) differential GPS (DGPS) meets accuracy requirement of 10 cm, so it is particularly well suited for applications mentioned herein. As is known in the art, error correction improves basic GPS accuracy, but error correction must typically be provided by a "base station." The base station is typically located at a precisely known position for absolute accuracy. If the base station location is not accurately known, high accuracy relative to the base station's location is, however, still achievable (high accuracy relative to base station's position, but not in absolute terms). Accuracy of 1 to 3 cm is achievable, either absolute or relative. GPS typically requires receiver access to five GPS satellites, and receiver hardware is mature and readily-available commercially. Wide Area Augmentation System (WAAS) implementation is likely to replace base station need in the future, which may be beneficial given that the base station must typically be moved forward after each 10 km landmine distance is cleared, presenting logistical and tactical problems.

Second, error-correction signals are available via commercial navigation systems, which utilize both GPS and supplemental error-correcting systems. These systems require receiver access to four GPS satellites, one geo-stationary satellite. Error corrections are typically transmitted from geo-stationary commercial satcom systems (INMARSAT, INTELSAT, etc). These systems eliminate the requirement for a stationary earth base station and are still capable of meeting 10 cm accuracy requirement important for high-accuracy applications such as landmine marking and clearing. Hardware for these systems is mature and readily-available commercially.

Laser Tracker Positioning

Laser positioning system such as laser tracking system 104 may include laser rangefinder equipment that allows distance measurement to within centimeter accuracy. A known distance and reference angle allows accurate location of items of interest within a polar coordinate system referenced to the laser tracker, which provides a means for maintaining relative positioning of remote controlled vehicles such as MDVs within satisfactory accuracy ranges (e.g., 10 cm) even without GPS availability. In different embodiments relating to landmine applications, although vehicle echelon formation may be maintained via a laser tracking system, subsequent positioning of other vehicle for conformation or neutralization may no longer possible. Therefore, visual access to potential mine locations may be required for secondary vehicle positioning. Switchover to laser tracking system (from GPS) may require re-establishing a tight echelon formation. GPS operation may allow a formation to extend or stretch out, and laser tracking may maintain a tight formation once re-established.

Summary of Navigational Configuration

The use of multiple navigation methods allows operation in all conditions. A stationary satellite-based DGPS system meets all requirements for vehicle navigation typical in landmine applications, readily meeting a 10 cm accuracy requirement and involving well understood, mature technology that eliminates on-site base station requirement. Laser tracking also meets all requirements for landmine vehicle navigation and allows continued operation after GPS dropout. Laser tracking along with compass navigation and/or wheel encoders may be used to maintain echelon formation of MDVs, and physical mine marking may be performed by MDVs during laser positioning. Real time velocity information from MDV wheel encoders and on-board fluxgate compass may allow accurate mine location marking. Secondary vehicles may access mine locations visually.

GPS Dropout Conditions

GPS dropout conditions may occur because of moving into an area with terrain or canopy blockage. With reference, to FIG. 3, MDV #1 204a, as lead vehicle, may be assumed to encounter dropout first. MDVs 2 and 3 (204b and 204c) are expected to be able to proceed to the point of dropout for MDV #1 204a.

When dropout occurs, MDVs #2 and 3 (204b and 204c) may proceed, under GPS, to reestablish a tight echelon formation. MDVs may proceed using a laser tracking positioning system to maintain formation, aided by compass and wheel encoder speed information.

In one embodiment, manual positioning of MDVs #1 and 2 relative to 3 may be performed to reestablish tight echelon formation in the case of concurrent GPS loss by all three vehicles. Mines may be marked physically while operating in GPS dropout conditions.

With the benefit of the present disclosure, those having skill in the art will comprehend that techniques claimed herein and described above may be modified and applied to a number of additional, different applications, achieving the same or a similar result. The claims attached hereto cover all such modifications that fall within the scope and spirit of this disclosure.

The following examples are included to demonstrate specific embodiments of this disclosure. It should be appreciated by those of skill in the art that the techniques disclosed in the examples that follow represent techniques discovered by the inventors to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Tele-Operation Requirements

In one specific embodiment, the following may be representative of navigational requirements for landmine applications. The remote control system shall allow remote control of MDVs at all speeds up to 10 kph in mission execution mode. An administrative movement mode shall allow remote control of the vehicles at all speeds up to 40 kph. The remote control system shall provide for safe and effective remote operation of the vehicles. A maximum of three remote control systems shall be capable of simultaneous operation to support echelon movement of MDVs and up to three control vehicles. The system shall be capable of maintaining five meter minimum separation among MDVs, and 25 meter minimum separation from MDVs to control vehicles. The system shall be capable of controlling vehicles at non-line-of-sight distances of at least 300 meters. The system shall provide fail-safe features to minimize hazards from any failed tele-operation of the system.

First GPS Based Tele-operation Mode of Operation

The following is one specific mode of remote control operation using the navigational techniques of this disclosure. With reference to FIG. 3, MDV #1 may be lead vehicle, occupying either an outside position (left or right selectable in mission software). MDV #1 may be operated (manually driven) via tele-operation by an MDV operator, using video feedback and joystick control. MDV #1, via onboard GPS, may generate a series of electronic waypoints along its manually driven path. Offset electronic waypoints, based on the desired echelon formation, may be calculated and passed to MDVs 2 and 3. MDVs 2 and 3 may operate in semi-autonomous mode as they self-navigate along the provided sets of electronic waypoints.

Second GPS Based Tele-operation Mode of Operation

The following is another specific mode of remote control operation using the navigational techniques of this disclosure and with particular reference to FIG. 3. The second GPS based tele-op mode may be available when accurate, digital maps of the mission area are available for download and utilization. A mission planning operator may designate a series of electronic GPS waypoints on the digital map that will become the path for MDV #1. MDV #1 may proceed along the designated waypoint path in semi-autonomous mode. As it proceeds, offset electronic waypoints may be calculated for MDVs 2 and 3 as in the previous GPS based mode of operation. MDVs 2 and 3 may function in the same fashion as in the previous GPS based mode of operation. An MDV operator's function may become primarily oversight: watching for obstacles, lane width changes, vehicle status, etc.

Laser Tracker Based Tele-operation Mode of Operation

The following is another specific mode of remote control operation using the navigational techniques of this disclosure and with particular reference to FIG. 3. Laser tracking tele-op mode allows mission execution when GPS is not available or is expected to be unreliable (frequent drop outs expected). MDV #1 may be manually controlled as in the primary mode. MDVs 2 and 3 may be maintained in echelon formation through the use of a laser tracking system, augmented with compass heading and wheel speed information provided from each vehicle. Mine locations may be marked physically for visual access by follow-on vehicles.

Performance Capabilities of Exemplary System

The following are specific performance capabilities of remote control systems using the navigational techniques of this disclosure. In one embodiment, an operator's display may include a conventional 2-D flat panel display coupled to single video camera, manually steered. A multi-function joystick control may be included. Up to 256 vehicle control/actuator channels may be present. Video and data links may be made via wireless Ethernet LAN in RS-232 format. Vehicles may be individually addressable for manual steering. Echelon formation may utilize MDV #1 position with offset electronic waypoints for MDVs 2 and 3. MDV #1 can occupy either left-most or right-most lead position. Eight-meter, 6-meter, and 4-meter echelon width options may be be quickly selectable, and support may be provided for pathway width variation.

Representative Component List

The following is a list of suitable components for use with embodiments of the present disclosure. Those having ordinary skill in the art will recognize that other equipment may be used as well.

Portable Computer: Miltope model TSC-750
Modem: FreeWave, model DGMR-115R
Antennas, 3 dB omni (modem): FreeWave, model EAN0900WC
GPS Receiver: Novatel, model RTK-2
Fluxgate Compass: Honeywell model HMR 3000
Vehicle Actuators: Motion Systems, models 85261 and 85199
Laser Tracker: Measurement Devices Ltd., model Fan-Beam 4

With the benefit of the present disclosure, those having skill in the art will comprehend that techniques claimed herein may be modified and applied to a number of additional, different applications, achieving the same or a similar result. The claims attached hereto cover all such modifications that fall within the scope and spirit of this disclosure.

References

Each of the following references is incorporated by reference in its entirety:
U.S. Pat. No. 6,292,751
U.S. Pat. No. 6,122,572
U.S. Pat. No. 5,890,091
U.S. Pat. No. 6,411,871
U.S. Pat. No. 6,072,433
U.S. Pat. No. 5,307,272
U.S. Pat. No. 6,333,631
U.S. Pat. No. 5,684,696

What is claimed is:

1. A method for navigating a remote controlled vehicle, comprising:
    (a) navigating the vehicle using Global Positioning System (GPS); and
    (b) navigating the vehicle using a laser tracking system and one or both of:
        (i) a compass; and
        (ii) wheel encoders upon dropout of the GPS.

2. The method of claim 1, the navigating comprising maintaining the vehicle in echelon formation with other vehicles.

3. The method of claim 2, the vehicles comprising mine detection vehicles (MDVs).

4. The method of claim 1, the GPS comprising differential GPS.

5. The method of claim 1, the navigating using a laser tracking system and one or both of (i) a compass and (ii) wheel encoders occurring automatically upon dropout of the GPS.

6. The method of claim 1, further comprising navigating the vehicle using a physical waypoint marker upon dropout of the GPS.

7. The method of claim 1, further comprising navigating the vehicle using an inertial navigation system upon dropout of the GPS.

8. The method of claim 7, further comprising using a zero velocity update algorithm in conjunction with the inertial navigation system.

9. A method for maintaining a formation of remote controlled vehicles, comprising:
(a) navigating the vehicles using Global Positioning System (GPS) to maintain the formation; and
(b) navigating one or more of the vehicles using a laser tracking system and one or both of:
(i) a compass; and
(ii) wheel encoders upon dropout of the GPS to maintain the formation.

10. The method of claim 9, the formation comprising an echelon formation.

11. The method of claim 10, the vehicles comprising mine detection vehicles (MDVs).

12. The method of claim 9, the GPS comprising differential GPS.

13. The method of claim 9, one vehicle experiencing GPS dropout at a different time than another vehicle.

14. The method of claim 9, further comprising navigating one or more of the vehicles using a physical waypoint marker upon dropout of the GPS to maintain the formation.

15. The method of claim 9, further comprising navigating one or more of the vehicles using an inertial navigation system upon dropout of the GPS to maintain the formation.

16. The method of claim 15, further comprising using a zero velocity update algorithm in conjunction with the inertial navigation system.

17. A method for maintaining an echelon formation of remote controlled mine detection vehicles (MDVs), comprising:
(a) navigating the MDVs using a differential Global Positioning System (DGPS) to maintain the echelon formation;
(b) experiencing a dropout of the DGPS in one or more MDVs;
(c) navigating each MDV not experiencing the dropout using the DGPS system to maintain the echelon formation; and
(d) navigating each MDV experiencing the dropout using a laser tracking system and one or more of:
(i) a compass;
(ii) wheel encoders; and
(iii) a physical waypoint marker upon dropout of the DGPS to maintain the formation.

18. A remote controlled vehicle configured to maintain a formation with other vehicles, comprising:
a Global Positioning System (GPS) configured to navigate the vehicle to maintain the formation;
a laser tracking system;
a compass;
wheel encoders; and
wherein the laser tracking system and compass or wheel encoders are configured to navigate the vehicle to maintain the formation upon dropout of the GPS.

19. The method of claim 9, where maintaining the formation of remote controlled vehicles is done by a single operator.

20. The method of claim 9, where a positional error between two vehicles comprises ±10 cm.

21. The method of claim 9, where the dropout of the GPS comprises the dropout of the GPS of said one or more of the vehicles.

22. The remote controlled vehicle of claim 18, where the maintaining a formation with other vehicles comprises following a lead vehicle.

23. A remote controlled vehicle configured to maintain a formation with a lead vehicle comprising:
a Global Positioning System (GPS) configured to navigate the vehicle to maintain the formation; and
a laser tracking system;
wherein the laser tracking system is configured to navigate the vehicle to maintain the formation upon dropout of the GPS.

24. The remote controlled vehicle of claim 18, where the laser system is aided by at least one or both of a heading and wheel speed information to maintain the formation upon dropout of the GPS.

* * * * *

UNITED STATES PATENT AND TRADEMARK OFFICE
CERTIFICATE OF CORRECTION

PATENT NO. : 6,859,729 B2  Page 1 of 1
APPLICATION NO. : 10/274839
DATED : February 22, 2005
INVENTOR(S) : Breakfield et al.

It is certified that error appears in the above-identified patent and that said Letters Patent is hereby corrected as shown below:

Title page, item [73] delete "Bae Systems" substitute --BAE SYSTEMS--

In claim 5, column 10, line 56, delete "of(i)" substitute --of (i)--

Signed and Sealed this

Fifth Day of September, 2006

JON W. DUDAS
*Director of the United States Patent and Trademark Office*